J. P. DOWD & M. S. THOMPSON.
DUMPING TRUCK.
APPLICATION FILED MAR. 14, 1914.
1,131,489.
Patented Mar. 9, 1915.
2 SHEETS—SHEET 2.
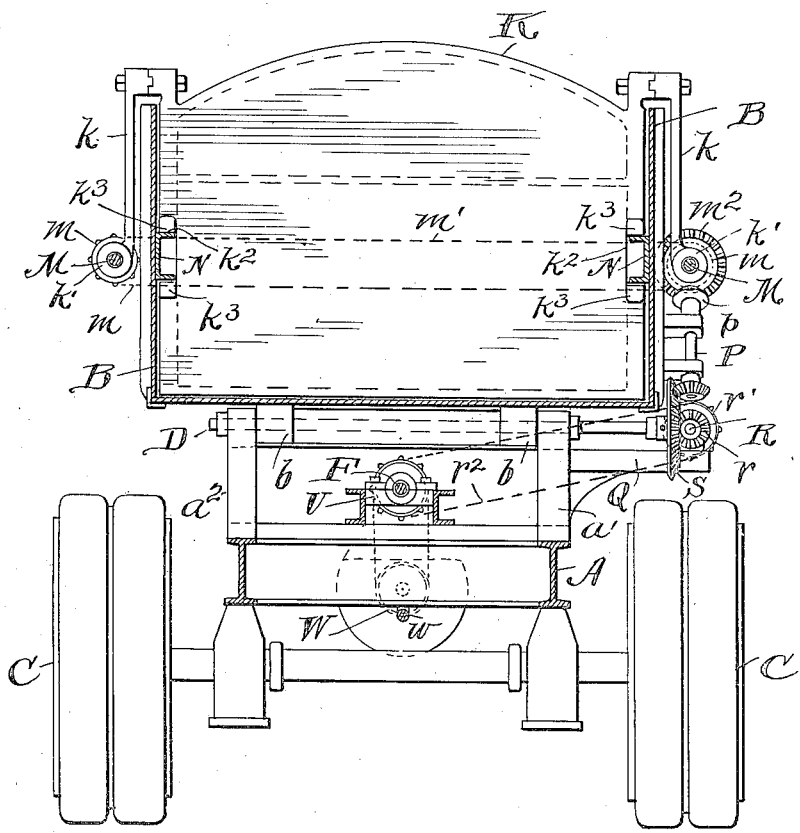
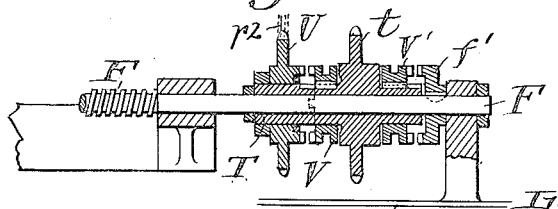

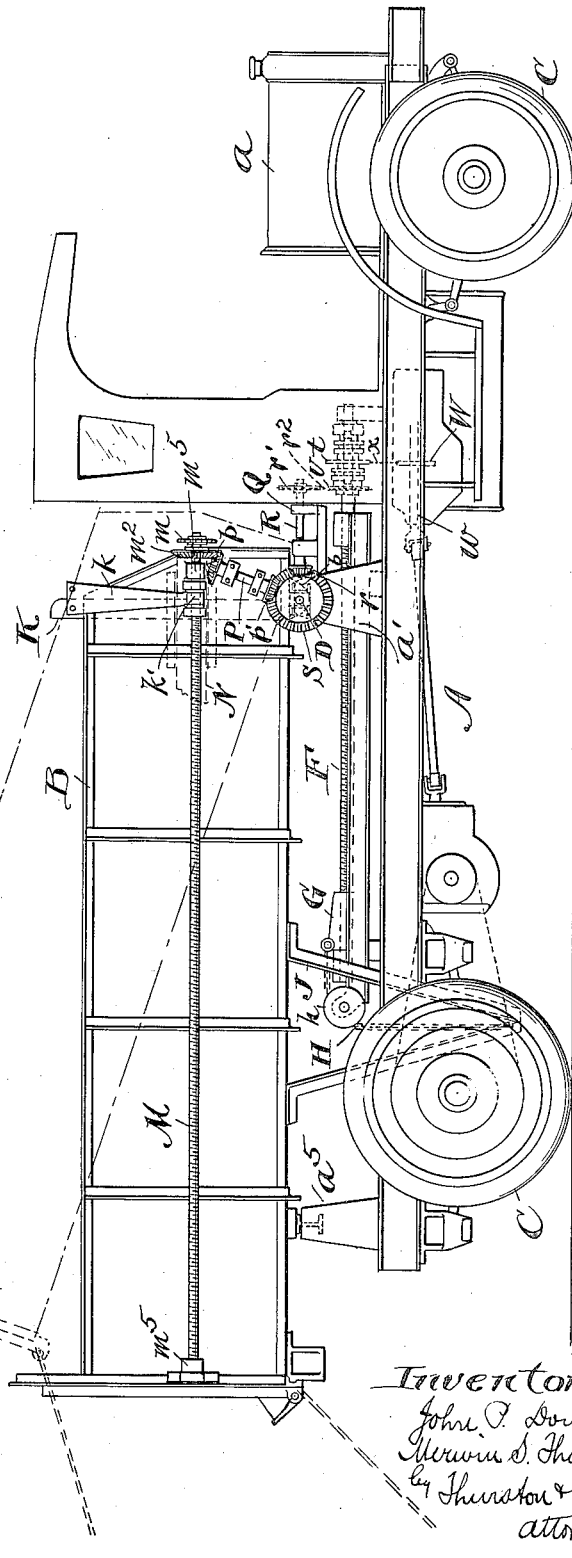
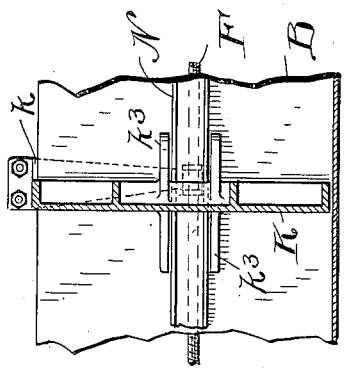

UNITED STATES PATENT OFFICE.

JOHN P. DOWD, OF CLEVELAND, AND MERWIN S. THOMPSON, OF PAINESVILLE, OHIO, ASSIGNORS OF ONE-HALF TO THE BROWN HOISTING MACHINERY COMPANY, OF CLEVELAND, OHIO, A CORPORATION OF DELAWARE, AND ONE-HALF TO THE WHITE COMPANY, OF CLEVELAND, OHIO, A CORPORATION OF OHIO.

DUMPING-TRUCK.

1,131,489.        Specification of Letters Patent.        Patented Mar. 9, 1915.

Application filed March 14, 1914. Serial No. 824,601.

*To all whom it may concern:*

Be it known that we, JOHN P. DOWD and MERWIN S. THOMPSON, citizens of the United States, and residents, respectively, of Cleveland, in the county of Cuyahoga and State of Ohio, and Painesville, in the county of Lake and State of Ohio, have invented a certain new and useful Improvement in Dumping-Trucks, of which the following is a full, clear, and exact description.

In the ordinary dumping truck, the body is supported on a transverse axis located near its rear end, and in order to dump the load, the body is tilted about said supporting axis by lifting the front end of the body until the floor thereof lies at such an angle that the load will flow by gravity down and out of its rear end. The lifting of the front end of the body is accompanied by a depression of the rear end. Wherefore, when the body has been tilted to the load-discharging position, the rear end of the body is so near the ground, that the entire load cannot run out of it. That is to say, when a part of the load has run out, it will form a pile which acts as a barrier to the further discharge of the load. This necessitates either that the truck be moved forward while the body is so tilted, or that the undumped part of the load be shoveled out or thrown out by hand.

The object of this invention is to provide a dumping motor truck which is constructed so that the entire load can be dumped in a compact pile, without either moving the truck, or resorting to hand labor; also to enable the dumping of the load over a fence, or over the side of a bin; or, (as for example, in unloading coal) to dump the load into a chute which may be inclined at such an angle that the load discharged from the body will run by gravity down the chute into the coal hole. To bring about these results, the body is supported on the truck frame on a transverse axis located near its front end, instead of near its rear end, so that when the body is tilted about its supporting axis, the rear end will be elevated; and a follower is put into the body, and is connected by appropriate power-transmitting mechanism with the motor supported on the truck frame, so that said follower may be forcibly moved rearward in the body, and thereby push the load out of the rear end thereof.

The invention consists in the operative combination of the above mentioned parts, and of numerous other more specific and subordinate combinations which are shown in the accompanying drawings, and are hereinafter described and definitely pointed out in the appended claims.

In the drawings, Figure 1 is a side elevation of a dumping motor truck embodying the invention; Fig. 2 is a transverse vertical section thereof; and Fig. 3 is a longitudinal vertical section through the front end of the body tilting screw and associated parts; and Fig. 4 is a sectional side elevation of the follower and a part of one side of the body.

Referring to the parts by letters, A represents the usual chassis frame of a motor driven vehicle which is supported on wheels C and in turn supports at its front end under the hood $a$ a motor which is not shown.

B represents the body for containing the load. Two brackets $a^1$, $a^2$, fixed to the side members of the chassis frame support a horizontal transverse shaft D which serves to support and pivot the front end of the body, which body has projecting downward from points near its front end the brackets $b$ which embrace and are adapted to turn upon the said shaft D. The means shown for tilting the body about this axis is substantially the same as that which forms the subject matter of Patent No. 1,069,749. That is to say, there is a rotatable longitudinally extended screw F mounted in bearings on the truck frame, and suitable mechanism intermediate of the screw and motor whereby the screw may be turned in either direction at will. There is a nonrotating nut G upon the screw, and this is connected by a chain H with an arm J secured to and extending down from the bottom of the body, said chain running over a guide sheave $h$. By turning this screw in one direction, the nut is caused to travel forward, and thereby lift the rear end of the body; and by turning it in the opposite direction the body will be allowed to swing down to the normal horizontal position, in which its rear end rests on brackets $a^5$.

Within the body and normally occupying a position at the front end thereof so that it serves as the front end of the body is a follower plate K.

Mounted in bearings outside of the body and at the front and rear ends thereof is a screw M which is parallel with the bottom of the body. Vertical arms $k$, which lie outside of the body are connected at their upper ends with the top of the follower, extending over the top of the sides of the body. At their lower ends these arms are provided with elongated internally threaded nuts $k^1$ which are respectively fitted on the screws M. Therefore when both screws are turned in unison, the follower plate will be moved in said body backward or forward, as the case may be. To aid in keeping the follower plate in its upright position, two longitudinally extended channel bars N are fixed to the inner faces of the sides of the body, and the follower plate has notches $k^2$ in its sides which embrace said channel bars; and the arms $k^3$ fixed to both the front and rear sides of the follower plate, both above and below the channel irons, act in conjunction with said channel irons to help to hold the follower plate in the upright position.

On the front end of each screw M is a sprocket wheel $m$; and these two sprocket wheels are connected by a sprocket chain $m^1$, so that both are compelled to rotate in unison. Near the front end of one of these screws a beveled gear $m^2$ is fixed. A beveled gear S is rotatably mounted on the same shaft D which serves as the fulcrum about which the body tilts. A shaft P, mounted in bearings on the side of the body, carries at its upper end a beveled gear $p$ which meshes with the beveled gear $m^2$, and at its lower end it carries a beveled gear $p^1$ which meshes with the beveled gear S. A horizontal longitudinally extended shaft R is mounted in bearings on a bracket Q, which is fixed to the chassis frame, and at its rear end it has a beveled gear $r$ which meshes with a beveled gear S, and at its front end it has a sprocket wheel $r^1$.

Rotatably mounted on the front end of the screw F is a sleeve T, carrying a loosely mounted sprocket wheel U from which motion is transmitted to sprocket wheel $r^1$, by means of a sprocket chain $r^2$. A jaw clutch of familiar construction is provided for connecting sprocket wheel U to sleeve T. This clutch includes a sliding member V, which has a tongue and groove connection with the sleeve T, and jaws on said member V and the sprocket wheel U. Another clutching device is provided for connecting sleeve T with the screw F at will, the same consisting of a jaw carrying disk $f^1$ fixed to the screw, and a jaw carrying sliding member $V^1$ having a tongue and groove connection with the sleeve T. A sprocket chain X transmits power to the sprocket wheel $t$ which is fixed to sleeve T, from a sprocket W fixed to a shaft $w$ which may be driven in either direction through any appropriate mechanism from the motor.

It is obvious that by clutching the sprocket U to the sleeve T, the revolution of the latter in the proper direction, will cause the follower plate, through the train of mechanism described, to move backward in the body, irrespective of whether the body is in its horizontal position, or has its rear end tilted up; and thereby the load in the body can be pushed out of the rear end thereof. Likewise the follower plate can be moved in the contrary direction when the sleeve T is turned in the contrary direction. By clutching the sleeve T to the screw F, the body may be tilted to whatever degree desired. It is apparent that the tilting of the body and the movement of the follower therein may take place at the same time whenever this is desirable, or these two things may take place at different times, if that is thought desirable.

It is to be understood that other specific trains of mechanism for transmitting power from the motor to the follower plate may be substituted for that shown, and hereinbefore described, without departure from the broad invention. So also may means other than the means shown be employed for tilting the body.

Having described our invention, we claim:

1. In a dumping truck, the combination of the truck frame which is mounted on wheels, a body which is tiltably supported thereon on a horizontal transverse axis located near the front end of the body, means for tilting the rear end of the body upward, a follower in said body, and means for forcibly moving said follower rearward in the body.

2. In a motor driven dumping truck, the combination of a truck frame which is mounted on wheels, and a motor mounted thereon, with a body tiltably mounted on said truck frame on a horizontal transverse axis which is located near the front end of said body, means operable by said motor for tilting the rear end of said body upward, a follower movably fitted in said body, and means operable by said motor for forcibly moving said follower rearward in the body.

3. In a motor driven dumping truck, the combination with the truck frame which is mounted on wheels, a motor mounted thereon, a body tiltably mounted on said frame, on a horizontal transverse axis which is located near the front end of said body, a follower movably fitted in said body, means located on both sides of the body and supported thereby and connected respectively to opposite sides of the follower for forcibly moving said follower rearward, and means operable by said motor for operating the said devices which directly engage and move the follower.

4. In a dumping truck, the combination of a truck frame which is mounted on wheels, a body tiltably mounted thereon on a horizontal transverse axis which is located near the front end of the body, two screws rotatably mounted on opposite sides of the body, a follower in said body, arms fixed to said follower and extended over the top edges of the body, nuts carried by said arms and embracing and fitting said screws, and means for simultaneously turning the screws.

5. In a dumping truck, the combination of a truck frame which is mounted on wheels, a body tiltably mounted thereon on a horizontal transverse axis which is located near the front end of the body, a follower in said body, a power driven shaft mounted on said frame, and power transmitting mechanism intermediate of said shaft and follower, which mechanism includes one element which is mounted to rotate about an axis which is coincident with the axis about which the body turns when tilted.

6. In a dumping truck, the combination of a truck frame which is mounted on wheels, a body tiltably mounted thereon on a horizontal transverse axis which is located near the front end of the body, mechanism for tilting said body, a follower in said body, mechanism for moving the follower in said body, a power driven shaft mounted on said truck frame, and mechanism for simultaneously or separately transmitting motion from said shaft to the body tilting mechanism, and the follower moving mechanism.

In testimony whereof, we hereunto affix our signatures in the presence of two witnesses.

JOHN P. DOWD.
MERWIN S. THOMPSON.

Witnesses:
E. L. Thurston,
A. J. Hudson.